US011014210B2

(12) United States Patent
Yamamoto et al.

(10) Patent No.: US 11,014,210 B2
(45) Date of Patent: May 25, 2021

(54) CONTROLLER OF MACHINE TOOL

(71) Applicant: FANUC CORPORATION, Yamanashi (JP)

(72) Inventors: Kenta Yamamoto, Yamanashi (JP); Masashi Yasuda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 108 days.

(21) Appl. No.: 16/437,708

(22) Filed: Jun. 11, 2019

(65) Prior Publication Data

US 2020/0016712 A1 Jan. 16, 2020

(30) Foreign Application Priority Data

Jul. 10, 2018 (JP) .............................. JP2018-130878

(51) Int. Cl.
G05B 19/25 (2006.01)
G05B 19/416 (2006.01)
G05B 19/414 (2006.01)
B23Q 15/14 (2006.01)
B23Q 15/12 (2006.01)
B23Q 15/22 (2006.01)

(52) U.S. Cl.
CPC ............ *B23Q 15/14* (2013.01); *B23Q 15/12* (2013.01); *B23Q 15/225* (2013.01); *G05B 19/251* (2013.01); *G05B 19/4144* (2013.01); *G05B 19/4163* (2013.01); *G05B 19/4166* (2013.01)

(58) Field of Classification Search
CPC ...... B23Q 15/12; B23Q 15/14; B23Q 15/225; G05B 19/251; G05B 19/4144; G05B 19/4163; G05B 19/4166; G05B 2219/49384
See application file for complete search history.

(56) References Cited

U.S. PATENT DOCUMENTS

2014/0102268 A1* 4/2014 Hariki ..................... B23B 27/22
82/118
2016/0011579 A1* 1/2016 Watanabe .......... G05B 19/4103
700/187

FOREIGN PATENT DOCUMENTS

JP  5033929 B1  9/2012
JP  5139592 B1  2/2013
JP  5599523 B1  10/2014

* cited by examiner

Primary Examiner — Yuhui R Pan
(74) Attorney, Agent, or Firm — Studebaker & Brackett PC

(57) ABSTRACT

A controller of a machine tool includes a plurality of feed axes that feed a tool, machines a workpiece while making the tool oscillate and includes: an oscillation command creation unit which creates an oscillation command based on a machining condition; and a control unit which machines, based on the oscillation command and a movement command, the workpiece while making the tool oscillate, and the oscillation command creation unit creates, when the machining condition indicates machining by an interpolation operation of one feed axis of the plurality of feed axes, the oscillation command so as to make the tool oscillate in a direction along a machining path and changes, when the machining condition indicates machining by a simultaneous interpolation operation of the plurality of feed axes, the oscillation command so as to change the direction of the oscillation with respect to the machining path.

8 Claims, 7 Drawing Sheets

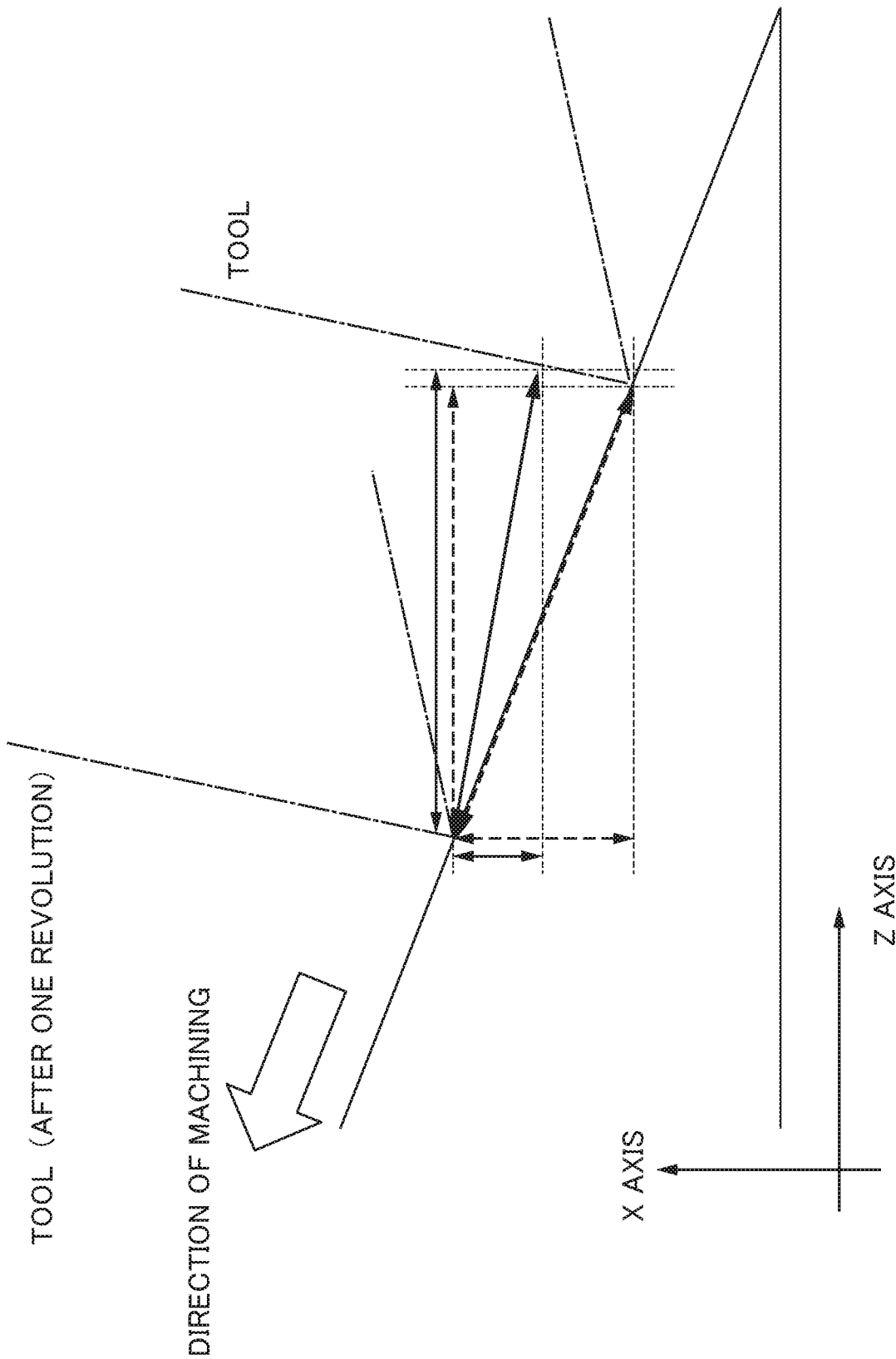

CONTROLLER OF MACHINE TOOL

This application is based on and claims the benefit of priority from Japanese Patent Application No. 2018-130878, filed on 10 Jul. 2018, the content of which is incorporated herein by reference.

BACKGROUND OF THE INVENTION

Field of the Invention

The present invention relates to a controller of a machine tool which performs oscillation cutting.

Related Art

When a workpiece is machined with a cutting tool of a machine tool, if chips are continuously generated, the chips may become entangled in the cutting tool. In such a case, it is necessary to stop the machine tool in order to remove the chips from the cutting tool, and thus it takes much time, with the result that the production efficiency thereof is lowered. Furthermore, the chips may damage the workpiece, and thus the quality of the workpiece may be lowered. In order to avoid such a defect, oscillation cutting is known in which the cutting tool and the workpiece are made to oscillate relatively in the direction of machining, and in which thus the chips are shredded (see, for example, Patent Documents 1 to 3). The controller of the machine tool which performs the oscillation cutting provides a sinusoidal feed command to a servo motor for a feed axis that feeds the cutting tool or the workpiece in the direction of the machining, and thereby makes the cutting tool and the workpiece oscillate relatively in the direction of the machining.

Patent Document 1: Japanese Patent No. 5033929
Patent Document 2: Japanese Patent No. 5139592
Patent Document 3: Japanese Patent No. 5599523

SUMMARY OF THE INVENTION

For example, when a desired workpiece machining shape is tubular or cylindrical, a feed axis which feeds a cutting tool or a workpiece in the direction of machining is only one axis (for example, a Z axis which will be described later). On the other hand, for example, when the desired workpiece machining shape is conical or truncated conical (that is, a tapered shape) or when it includes an arc shape, feed axes which feed the cutting tool or the workpiece in the direction of the machining are a plurality of axes (for example, the Z axis and an X axis which will be described later). In this case, a plurality of axes oscillate simultaneously, and thus the magnitude of a load in a machine tool is increased, with the result that it disadvantageously costs more to provide a machine which can withstand such a load.

An object of the present invention is to provide a controller of a machine tool which reduces an increase in the magnitude of a load in the machine tool caused by oscillation cutting.

(1) A controller (for example, a controller 20 of a machine tool which will be described later) of a machine tool (for example, a machine tool 10 which will be described later) according to the present invention includes: a spindle (for example, a spindle M0 which will be described later) that relatively rotates a workpiece (for example, a workpiece W which will be described later) and a tool (for example, a tool 11 which will be described later); and a plurality of feed axes (for example, feed axes M1 and M2 which will be described later) that relatively feed the workpiece and the tool, machines the workpiece while making the tool and the workpiece oscillate relatively by a coordinated operation of the spindle and the feed axes so as to shred a chip generated by the machining and includes: an oscillation command creation unit (for example, an oscillation command creation unit 23 which will be described later) which creates an oscillation command based on a machining condition; and a control unit (for example, a control unit 26 which will be described later) which machines, based on the oscillation command and a movement command, the workpiece while making the tool and the workpiece oscillate relatively, and the oscillation command creation unit creates, when the machining condition indicates machining by an interpolation operation of one feed axis of the plurality of feed axes, the oscillation command so as to make the tool and the workpiece oscillate relatively in a direction along a machining path and changes, when the machining condition indicates machining by a simultaneous interpolation operation of the plurality of feed axes, the oscillation command so as to change the direction of the oscillation with respect to the machining path.

(2) In the controller of the machine tool described in (1), the oscillation command creation unit may include: an oscillation amplitude calculation unit (for example, an oscillation amplitude calculation unit 231 which will be described later) which calculates an oscillation amplitude based on an oscillation amplitude magnification and the movement command; and an oscillation command calculation unit (for example, an oscillation command calculation unit 233 which will be described later) which calculates the oscillation command based on the oscillation amplitude.

(3) In the controller of the machine tool described in (2), the oscillation amplitude calculation unit may calculate the oscillation amplitude magnification based on the machining condition and a machine condition.

(4) In the controller of the machine tool described in (3), the machining condition may include information indicating machining by an interpolation operation of the plurality of feed axes for a taper or an arc of the workpiece and a taper angle of the workpiece, and the machine condition may include an angle of the tool.

(5) The controller of the machine tool described in (2), may further include: a storage unit that previously stores information in which a plurality of the oscillation amplitude magnifications and a plurality of taper angles of the workpiece are associated with each other, and the oscillation amplitude calculation unit may acquire the oscillation amplitude magnification corresponding to the taper angle of the workpiece in the information.

(6) In the controller of the machine tool described in any one of (1) to (5), when the machining condition may indicate the machining by the simultaneous interpolation operation of the plurality of feed axes, the oscillation command creation unit may change the oscillation command so as to make the tool and the workpiece oscillate relatively in the direction of the feeding of one feed axis of the plurality of feed axes.

(7) A controller (for example, a controller 20 of a machine tool which will be described later) of a machine tool (for example, a machine tool 10 which will be described later) according to the present invention includes: a spindle (for example, a spindle M0 which will be described later) that relatively rotates a workpiece (for example, a workpiece W which will be described later) and a tool (for example, a tool 11 which will be described later); and a plurality of feed axes (for example, feed axes M1 and M2 which will be described later) that relatively feed the workpiece and the tool, machines the workpiece while making the tool and the workpiece oscillate relatively by a coordinated operation of the spindle and the feed axes so as to shred a chip generated by the machining and includes: an oscillation command creation unit (for example, an oscillation command creation unit 23 which will be described later) which creates an oscillation command based on a machining condition; and a control unit (for example, a control unit 26 which will be described later) which machines, based on the oscillation command and a movement command, the workpiece while making the tool and the workpiece oscillate relatively, and the oscillation command creation unit creates, when the machining condition indicates machining by an interpolation operation of one feed axis of the plurality of feed axes, the oscillation command so as to make the tool and the workpiece oscillate relatively in a direction along a machining path and changes, when the machining condition indicates machining by a simultaneous interpolation operation of the plurality of feed axes, the oscillation command so as to stop the oscillation.

According to the present invention, it is possible to provide a controller of a machine tool which reduces an increase in the magnitude of a load in the machine tool caused by oscillation cutting.

BRIEF DESCRIPTION OF THE DRAWINGS

FIG. 7 is a diagram for comparing the widths of oscillation in the feed axes (the Z axis and an X axis) in a case where oscillation is performed in a direction which is slightly inclined with respect to the direction of the Z axis in FIG. 6 and which is not the direction of the machining and the widths of oscillation in the feed axes (the Z axis and the X axis) in a case where oscillation is performed in the direction of the machining.

DETAILED DESCRIPTION OF THE INVENTION

Figure 1:
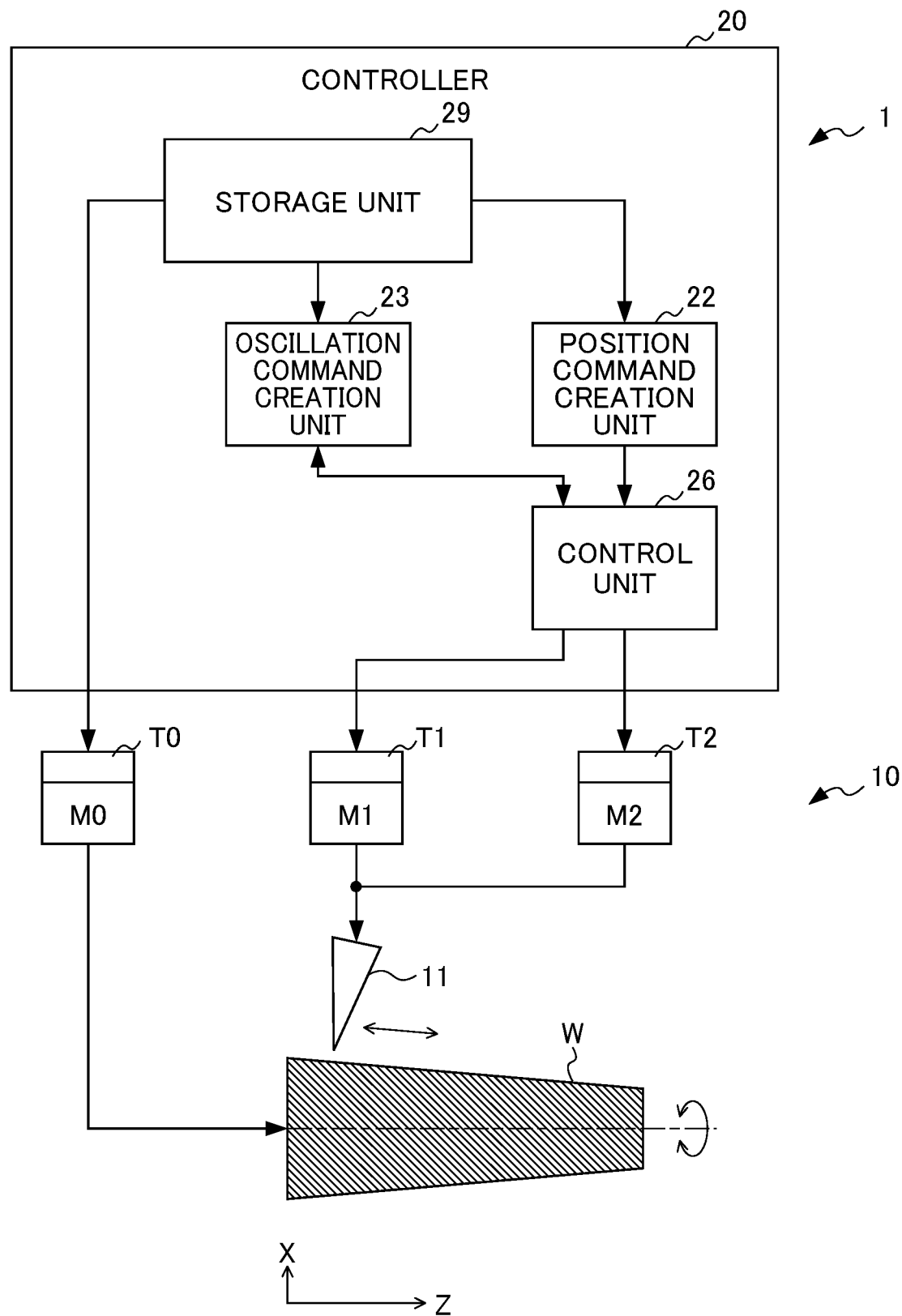
FIG. 1 is a diagram showing a machining system which includes a controller according to the present embodiment.

Examples of the embodiment of the present invention will be described below with reference to accompanying drawings. In the drawings, the same or corresponding parts are identified with the same reference numerals.

FIG. 1 is a diagram showing a machining system which includes a controller according to the present embodiment. The machining system 1 shown in FIG. 1 includes a machine tool 10 and the controller 20 which controls the machine tool 10.

The machine tool 10 includes a tool 11. The tool 11 performs cutting on a workpiece which has, for example, a tubular shape, a cylindrical shape, a conical shape or a truncated conical shape. In the example of FIG. 1, the tool 11 performs cutting on the outer circumferential surface of the workpiece W. In the example of FIG. 1, it is assumed that the center axis line of the workpiece serving as the rotation axis of the workpiece W is a Z axis and that an axis line perpendicular to the Z axis is an X axis. The machine tool 10 can machine not only a workpiece whose shape in a direction along the Z axis is linear but also a workpiece whose shape in the direction is arc-shaped. The machine tool 10 can machine not only the outer circumferential surface of a workpiece but also the inner circumferential surface of a tubular workpiece. The machine tool 10 can perform not only cutting but also machining such as grinding and polishing.

The machine tool 10 includes a spindle M0 and at least two feed axes M1 and M2 which perform a coordinated operation with the spindle M0. The spindle M0 includes a spindle motor or a servo motor, and the feed axes M1 and M2 include a servo motor. The spindle M0 and the feed axes M1 and M2 are controlled by the controller 20. The spindle M0 rotates the workpiece W about the center axis line (Z axis) of the workpiece. The feed axis M1 can both feed the tool 11 in the direction of the Z axis (first direction) and reciprocate the tool 11 in the direction of the Z axis, that is, make the tool 11 oscillate. The feed axis M2 can both feed the tool 11 in the direction of the X axis (second direction) and reciprocate the tool 11 in the direction of the X axis, that is, make the tool 11 oscillate.

When turning is performed on the workpiece which has a cylindrical shape or a tubular shape, the workpiece W is rotated about the center axis line (Z axis) of the workpiece, and the tool 11 is fed in only the direction of the Z axis (in this case, the direction of the machining) along the generatrix of the outer circumferential surface of the workpiece.

On the other hand, when turning is performed on a workpiece, such as a workpiece having a conical shape, a truncated conical shape or an arc shape, whose outside diameter differs in the direction of the Z axis, the workpiece W is rotated about the center axis line (Z axis) of the workpiece, and the tool 11 is fed in an oblique direction (combined direction of the direction of the Z axis and the direction of the X axis) (in this case, the direction of the machining) along the generatrix of the outer circumferential surface of the workpiece. In this case, since the tool 11 is fed in the oblique direction along the generatrix of the outer circumferential surface of the workpiece W, at least two feed axes M1 and M2 are needed. Both the feed axis M1 and the feed axis M2 are controlled, and thus the tool 11 is fed in the oblique direction along the generatrix of the outer circumferential surface of the workpiece W.

Figure 2:
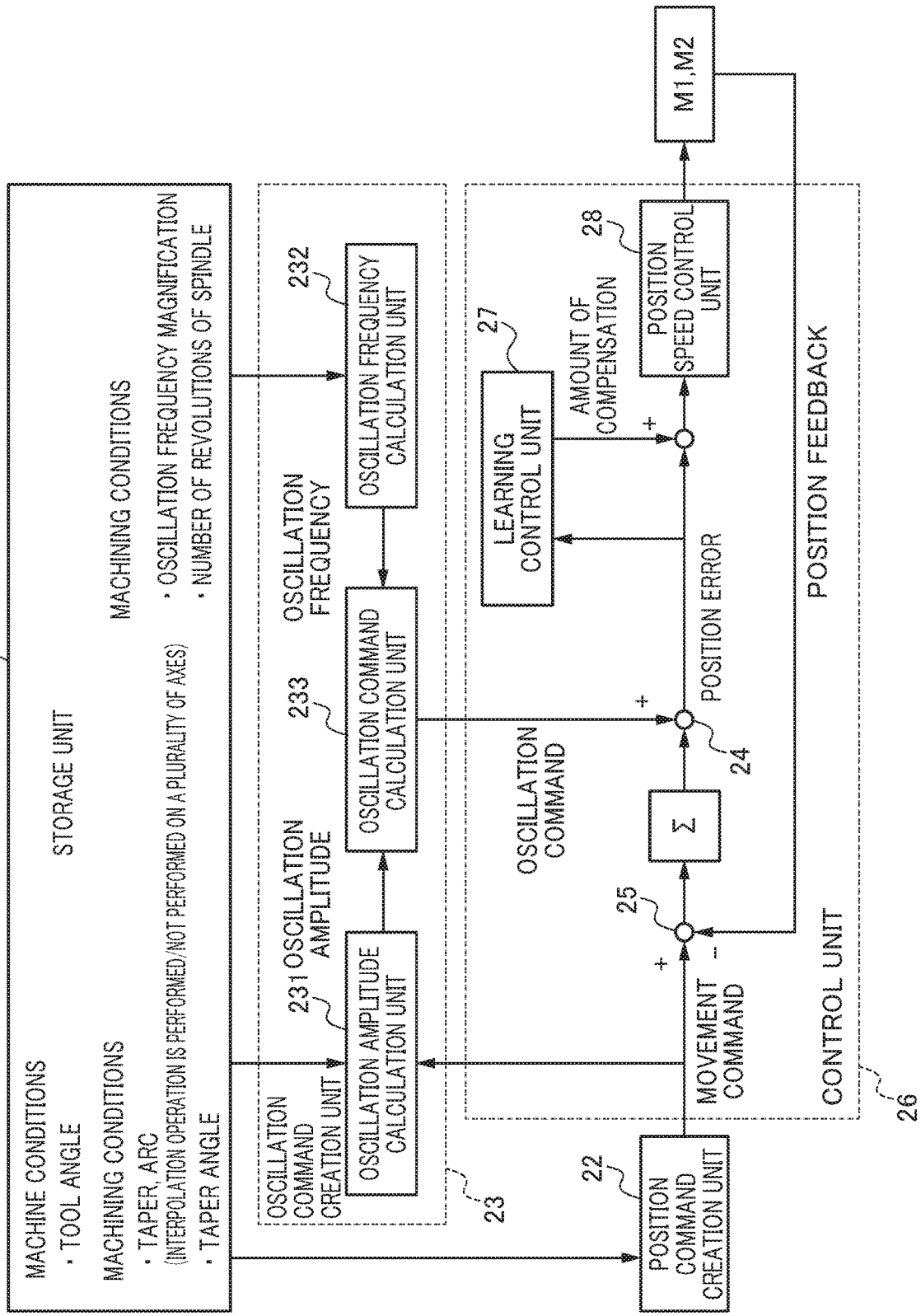
FIG. 2 is a block diagram showing an example of a more specific configuration of the controller according to the present embodiment, in particular, an oscillation command creation unit and a control unit.

The controller 20 is formed with a computer that includes a memory such as a ROM (read only memory) and a RAM (random access memory), a CPU (control processing unit) and a communication control unit which are connected to each other through a bus. The controller 20 further includes: a position command creation unit 22; an oscillation command creation unit 23 (which includes an oscillation amplitude calculation unit 231, an oscillation frequency calculation unit 232 and an oscillation command calculation unit 233 that will be described later and that are shown in FIG. 2); a control unit 26 (which includes an adder 24, a subtractor 25, a learning control unit 27 and a position speed control unit 28 that will be described later and that are shown in FIG. 2); and a storage unit 29, and the functions or operations of the individual units thereof can be achieved by the coordination of the CPU and the memory incorporated in the computer and a control program stored in the memory.

In the storage unit 29, machining conditions for the workpiece W and the like are stored. The machining conditions for the workpiece W include: the relative rotation speeds of the workpiece W and the tool 11 about the center axis line of the workpiece W; the relative feedrates of the tool 11 and the workpiece W; and position commands for the feed axes M1 and M2.

A high-level computer (not shown) such as a CNC (Computer Numerical Controller) or a PLC (Programmable Logic Controller) is connected to the controller 20, and the rotation speeds, the feedrates and the like described above may be input from the high-level computer to the storage unit 29. The storage unit 29 and the position command creation unit 22 may be included not in the controller 20 but in the high-level computer.

The storage unit 29 may store a machining program which is executed by the machine tool 10, and the CPU (not shown) within the controller 20 may read, from the machining program, the rotation speeds and the feedrates described above as the machining conditions so as to output them to the position command creation unit 22 and the control unit 26.

The position command creation unit 22 has the function of creating, based on the relative rotation speeds of the workpiece W and the tool 11 about the center axis line of the workpiece W and the relative feedrates of the tool 11 and the workpiece W, the position commands (movement commands) for the feed axes M1 and M2. The position commands indicate a target position to the control unit 26 when the tool 11 and the workpiece W are relatively fed in a direction (direction of the machining) along the generatrix of the outer circumferential surface of the workpiece W.

The oscillation command creation unit 23 creates, based on the rotation speed and the feedrate described above, an oscillation command for the feed axis M1 such that an oscillation frequency is a positive non-integral multiple of the rotation speed described above and that the tool 11 performs intermittent cutting on the workpiece W. The oscillation command is a periodic command which is created so as to be asynchronous with the rotation speed about the center axis line described above, and includes the oscillation frequency and an oscillation amplitude. The value of the term of S/60×I in formula (1) for the oscillation command which will be described later corresponds to the oscillation frequency, and the value of the term of K×F/2 in formula (1) corresponds to the oscillation amplitude. The details of the oscillation command creation unit 23 will be described later.

The intermittent cutting described above means that cutting is performed on the workpiece W while the tool 11 is being brought into contact with and separated from the workpiece W in a periodic manner, and is also referred to as oscillation cutting or vibration cutting. Although in FIG. 1, the workpiece W is rotated, and simultaneously, the tool 11 oscillates with respect to the workpiece W, the tool 11 may be rotated about the center axis line of the workpiece W, and simultaneously, the workpiece W may oscillate with respect to the tool 11. Although in FIG. 1, each of the feed axes M1 and M2 performs both the feed operation and the oscillation operation on the workpiece W, the feed operation and the oscillation operation on the workpiece W may be performed with separate feed axes, respectively.

The control unit 26 has the function of controlling the feed axes M1 and M2 by creating a torque command based on a combined command (for example, a position command value) obtained by adding the oscillation command described above to a position error which is a difference between the position commands described above and the actual positions of the feed axes M1 and M2. The actual positions of the feed axes M1 and M2 correspond to position feedback values obtained by position detection units (not shown) such as encoders incorporated in the feed axes M1 and M2.

Figure 3:
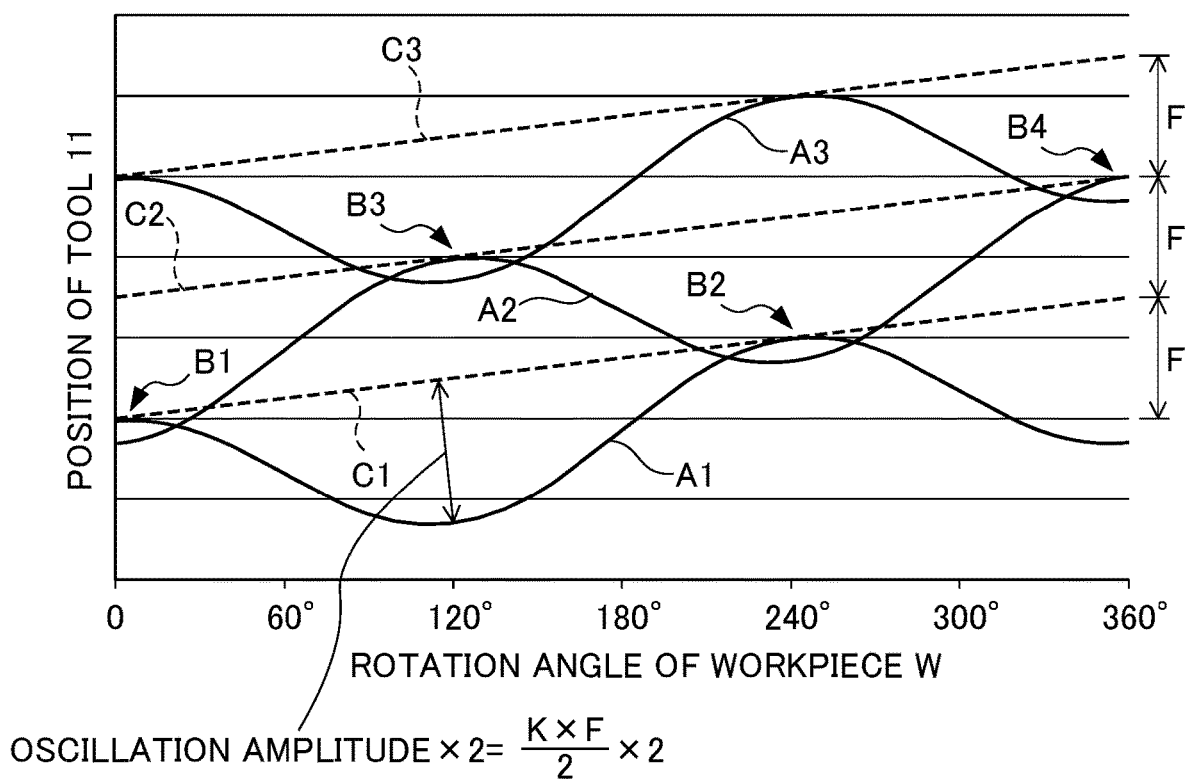
FIG. 3 is a diagram showing a relationship between a feed amount and a rotation angle.

The details of the oscillation command creation unit 23 will be described below. FIG. 3 is a diagram showing a relationship between a feed amount and a rotation angle. In FIG. 3, a horizontal axis represents the rotation angle of the workpiece W, and a vertical axis represents the feed amount of the tool 11 in the direction of the machining (that is, a direction along the generatrix of the outer circumferential surface of the workpiece W in FIG. 1). In FIG. 3, a plurality of linear broken lines C1, C2, C3, . . . which are obliquely extended are shown. As is found from FIG. 3, the vertical axis coordinates of an intersection between the broken line C1 and the vertical axis correspond to vertical axis coordinates at the start point of the subsequent broken line C2. Likewise, the vertical axis coordinates of an intersection between the broken line C2 and the vertical axis correspond to vertical axis coordinates at the start point of the subsequent broken line C3. These linear broken lines C1, C2, C3, . . . indicate the path of the tool 11 in the workpiece W when the oscillation command is not present. On the other hand, curves A1, A2 and A3, . . . shown in FIG. 3 indicate the path of the tool 11 on the workpiece W when the oscillation command is present. In other words, it is assumed that the broken lines C1, C2, C3 and the like indicate only the position commands (original command values) before the addition of the oscillation command and that the curves A1, A2, A3 and the like indicate the position commands after the addition of the oscillation command. Hence, the curves A1, A2 and A3 indicate commands which are obtained by adding the cosine wave-shaped oscillation command to each of the position commands indicated by the broken lines C1, C2 and C3.

The curve A1 is the path of the tool 11 in the first revolution of the workpiece W, the curve A2 is the path of the tool 11 in the second revolution of the workpiece W and the curve A3 is the path of the tool 11 in the third revolution of the workpiece W. For simplification, the paths of the tool 11 in the fourth and subsequent revolutions of the workpiece W are not shown.

The oscillation command creation unit 23 creates oscillation commands as follows. The oscillation command creation unit 23 determines a cosine wave-shaped oscillation frequency in order to create commands such as the curves A1, A2 and A3 in which the broken lines C1, C2 and C3 that are the position commands for the feed axes M1 and M2 created by the position command creation unit 22 are respectively reference axis lines. The value of the term of S/60×I in formula (1) which will be described later is the oscillation frequency.

When the oscillation frequency described above is determined, as shown in FIG. 3, the initial phase of the cosine wave-shaped curve A2 in which a certain broken line, for example, the broken line C2 is the reference axis line is preferably displaced a half period with respect to the cosine wave-shaped curve A1 in which the preceding broken line, for example, the broken line C1 is the reference axis line. The reason thereof is that when the reference axis line is displaced a half period, the oscillation amplitude of the oscillation command can be minimized and that consequently, it is possible to most efficiently shred chips.

The oscillation command creation unit 23 determines the oscillation amplitude of the oscillation command described above in order to create the commands such as the curves A1, A2 and A3 in which the broken lines C1, C2 and C3 are respectively reference axis lines. The value of the term of K×F/2 in formula (1) which will be described later is the oscillation amplitude. The curve A1 and the curve A2 shown in FIG. 3 overlap each other in a part B1 where the rotation angle is about 0 degrees and a part B2 where the rotation angle is about 240 degrees. As is found from FIG. 3, in the parts B1 and B2, the maximum value of the curve A1 with respect to the broken line C1 is larger than the minimum value of the curve A2 with respect to the broken line C2. In other words, the oscillation command creation unit 23 preferably determines the oscillation amplitude such that the preceding curve A1 and the subsequent curve A2 partially overlap each other. In the curves A1, A2 and A3, the feedrates are constant, and thus the oscillation amplitudes of the oscillation commands are all the same.

In the overlapping parts B1 and B2, the workpiece W is separated when the tool 11 performs machining in the path of the curve A2, and thus the workpiece W is prevented from being machined. In the present embodiment, the overlapping parts B1 and B2 as described above are periodically generated, and thus it is possible to perform so-called intermittent cutting. In an example shown in FIG. 3, a chip is generated in each of the parts B1 and B2 by an operation corresponding to the curve A2. In other words, in the curve A2 of the second revolution, two chips are generated. The intermittent cutting as described above is periodically performed, and thus oscillation cutting can be performed.

Furthermore, the curve A3 which is formed with respect to the broken line C3 has the same shape as the curve A1. The curve A2 and the curve A3 overlap each other in a part B3 where the rotation angle is about 1200 and a part B4 where the rotation angle is about 3600. A chip is generated in each of the parts B3 and B4 by an operation corresponding to the curve A3. In other words, in the curve A3 of the third revolution, two chips are generated. Thereafter, two chips are generated per revolution of the workpiece. However, in the first revolution, no chip is generated.

In this way, the oscillation frequency and the oscillation amplitude are determined, and thus the oscillation command creation unit 23 within the control unit 26 creates the oscillation command. For example, the oscillation command is indicated by formula (1) below.

$$\text{OSCILLATION COMMAND} = \frac{K \times F}{2} \cos\left(2\pi \times \frac{S}{60} \times I \times t\right) - \frac{K \times F}{2} \quad (1)$$

In formula (1), K represents an oscillation amplitude magnification, F represents the amount of movement of the tool 11 per revolution of the workpiece W, that is, a feed amount per revolution [mm/rev], S represents the rotation speed of the workpiece W about the center axis line [min$^{-1}$] or [rpm] and I represents an oscillation frequency magnification. Here, the oscillation frequency described above corresponds to the term of S/60×I in formula (1), and the oscillation amplitude described above corresponds to the term of K×F/2 in formula (1). However, the oscillation amplitude magnification K is a number equal to or greater than one, and the oscillation frequency magnification I is a non-integer greater than zero (for example, a positive non-integer such as 0.5, 0.8, 1.2, 1.5, 1.9, 2.3 or 2.5, . . . ). The oscillation amplitude magnification K and the oscillation frequency magnification I are constants (in the example shown in FIG. 3, I is 1.5). The reason why the oscillation frequency magnification I is not set to an integer is that in the case of an oscillation frequency which is exactly equal to the number of revolutions of the workpiece W about the center axis line, the overlapping parts B1, B2, B3, B4 and the like described above cannot be generated, and that thus it is impossible to obtain the effect of shredding chips by oscillation cutting.

In formula (1), the oscillation command is a command in which the term of (K×F/2) is subtracted as an offset value with respect to a cosine wave where each of the broken lines C1, C2 and C3 indicating the position command is the reference axis line. Hence, the position path of the tool 11 based on a combined command value obtained by adding the oscillation command to the position command can be controlled with the assumption that the position of the tool 11 in the direction of the machining by the position command is an upper limit. Therefore, the curves A1, A2, A3 and the like in FIG. 3 are prevented from exceeding the broken lines C1, C2, C3 and the like in a positive direction (that is, the direction of the machining of the tool 11). Furthermore, the oscillation command as indicated by formula (1) is provided, and thus as is found from the curved line A1 in FIG. 3, large oscillation is prevented from being produced at the machining start point (position of 00 in the horizontal axis) of the tool 11 in the direction of the feeding of the tool 11 from the beginning. The initial values of the individual parameters (K and I in formula (1)) which are adjusted when the oscillation frequency and the oscillation amplitude are determined are assumed to be stored in the storage unit 29 before the operation of the machine tool 10. The rotation speed (S) of the workpiece W is previously stored in the storage unit 29 as the machining condition. The feed amount per revolution F is determined from the rotation speed (S) and the position command created by the position command creation unit 22.

FIG. 2 is a block diagram showing an example of a more specific configuration of the controller 20, in particular, the oscillation command creation unit 23 and the control unit 26. The controller 20 shown in FIG. 2 includes the storage unit 29, the position command creation unit 22, the oscillation command creation unit 23 and the control unit 26. The storage unit 29 and the position command creation unit 22 may be included in a high-level computer (not shown) such as an NC device which is connected to the controller 20.

The oscillation command creation unit 23 creates and changes the oscillation command based on the machining conditions. In general, when a workpiece machining shape is tubular or cylindrical, oscillation is performed along the direction of the machining which is the direction of the feed axis M1 (Z axis) along the generatrix of the outer circumferential surface of the workpiece W. On the other hand, when the workpiece machining shape is conical or truncated conical (tapered) or when it includes an arc shape, oscillation is generally performed along an oblique direction along the generatrix of the outer circumferential surface of the workpiece W, that is, the direction of the machining which is the combined direction of the direction of the feed axis M1 (Z axis) and the direction of the feed axis M2 (X axis). In this case, oscillation is simultaneously performed in the feed axes M1 and M2, and thus the magnitude of a load in the machine tool is increased.

Hence, in the present embodiment, when the workpiece machining shape is tubular or cylindrical, that is, when the machining conditions indicate machining by an interpolation operation of only the feed axis M1 of the feed axes M1 and M2, the oscillation command creation unit 23 likewise creates the oscillation command such that the tool 11 and the workpiece W are made to oscillate relatively in a direction along a machining path, that is, the direction of the machining (direction of the Z axis). On the other hand, when the workpiece machining shape is conical or truncated conical (tapered) or when it includes an arc shape, that is, when the machining conditions indicate machining by a simultaneous interpolation operation of the feed axes M1 and M2, the oscillation command creation unit 23 changes the oscillation command such that the direction of oscillation is changed with respect to the direction along the machining path (for example, the direction may be changed with respect to a direction tangent to the machining path). For example, when the feed axis M2 is made to oscillate, and thus the magnitude of the load in the machine is increased, the direction of the oscillation is changed such that the oscillation of the feed axis M2 is decreased, with the result that the magnitude of the load in the entire machine can be decreased. The oscillation command creation unit 23 includes the oscillation amplitude calculation unit 231, the oscillation frequency calculation unit 232 and the oscillation command calculation unit 233.

The oscillation amplitude calculation unit 231 calculates, based on the machining conditions and machine conditions, the oscillation amplitude magnifications K for the feed axes M1 and M2 (the Z axis and the X axis) so as to calculate, based on these oscillation amplitude magnifications K and the movement command, the oscillation amplitudes K×F/2 for the feed axes M1 and M2 (the Z axis and the X axis). Here, the machining conditions include information indicating machining by the interpolation operation of the feed axes M1 and M2 for a taper or an arc of the workpiece W and a taper angle θ1 of the workpiece W (see FIGS. 4 and 6). The machine conditions include the angle θ2 of the tool 11, that is, a cutting angle θ2 with respect to the center axis (Z axis) of the workpiece W (see FIGS. 4 and 6). The machining conditions and the machine conditions may be previously stored in, for example, the storage unit 29 or may be acquired from the machining program. The movement command includes the amount of movement F of the tool 11 per revolution of the workpiece W, that is, the feed amount per revolution [mm/rev].

Specifically, when the workpiece machining shape is tubular or cylindrical, that is, when the machining conditions indicate the machining by the interpolation operation of only the feed axis M1 of the feed axes M1 and M2, the oscillation amplitude calculation unit 231 calculates the oscillation amplitude magnification K for only the feed axis M1 (Z axis) such that the tool 11 and the workpiece W are made to oscillate relatively in the direction along the machining path, that is, the direction of the machining (direction of the Z axis along the generatrix of the outer circumferential surface of the workpiece), and calculates, based on this oscillation amplitude magnification K, the oscillation amplitude K×F/2 for only the feed axis M1 (Z axis). More specifically, the oscillation amplitude calculation unit 231 calculates, based on a predetermined oscillation amplitude magnification K, the oscillation amplitude K×F/2.

On the other hand, when the workpiece machining shape is conical or truncated conical (tapered) or when it includes an arc shape, that is, when the machining conditions indicate the machining by the simultaneous interpolation operation of the feed axes M1 and M2, the oscillation amplitude magnifications K for the feed axes M1 and M2 (the Z axis and the X axis) are calculated such that the direction of oscillation is changed with respect to the machining path, that is, the tool 11 and the workpiece W are made to oscillate relatively in a direction which is not the direction of the machining (combined direction of the direction of the Z axis along the generatrix of the outer circumferential surface of the workpiece and the direction of the X axis), and the oscillation amplitudes K×F/2 for the feed axes M1 and M2 (the Z axis and the X axis) are calculated based on the oscillation amplitude magnifications K.

Figure 4:
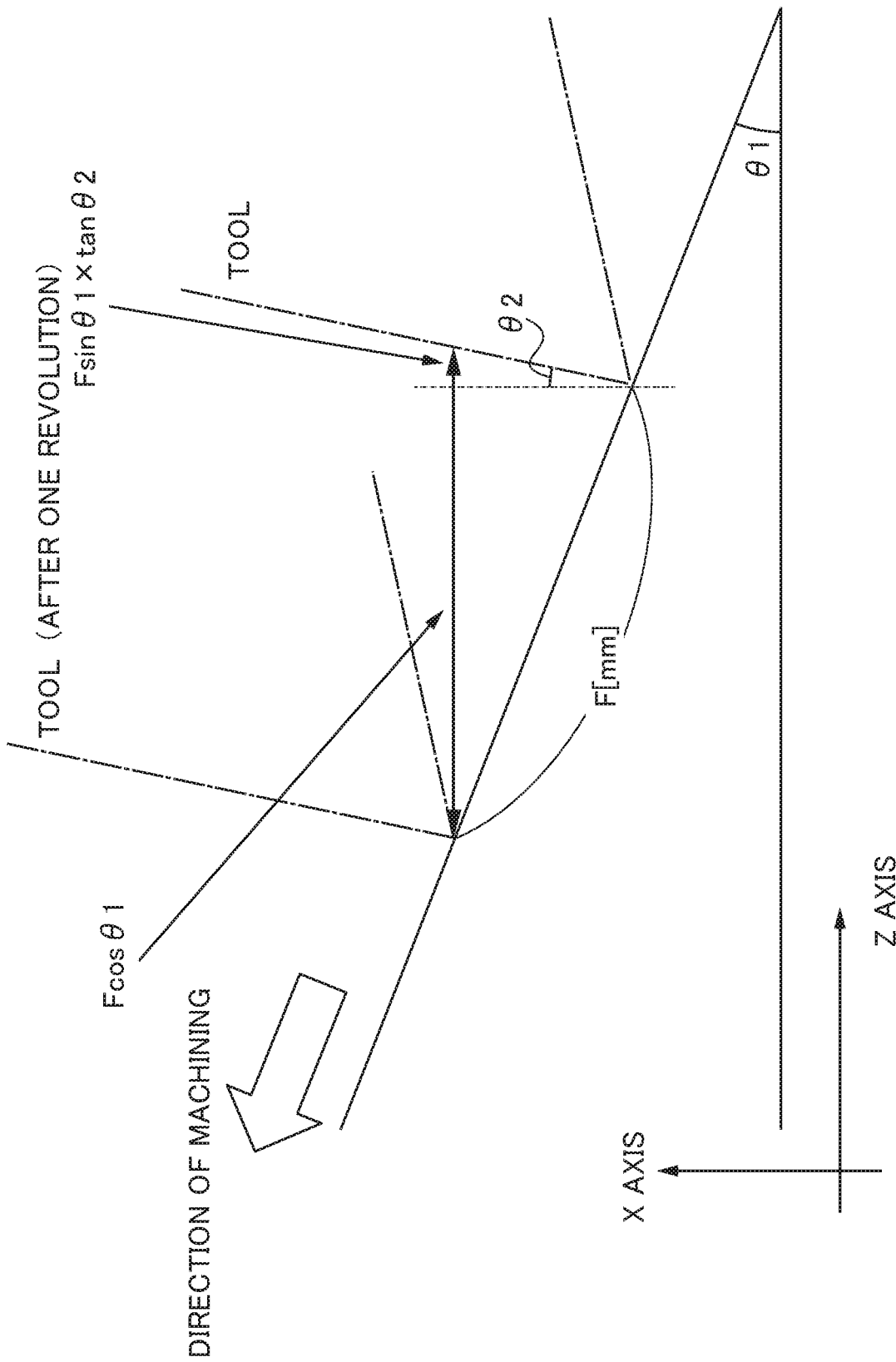
FIG. 4 is a diagram for illustrating a method of calculating, when a workpiece machining shape is conical or truncated conical (tapered) or when it includes an arc shape, an oscillation amplitude magnification for a feed axis (Z axis) in a case where oscillation is performed in only the direction of the Z axis which is not the direction of machining.

FIG. 4 is a diagram for illustrating a method of calculating, when the workpiece machining shape is conical or truncated conical (tapered) or when it includes an arc shape, an oscillation amplitude magnification K for the feed axis M1 (Z axis) in a case where oscillation is performed in only the direction of the Z axis which is not the direction of the machining. In FIG. 4, F represents the amount of movement of the tool 11 per revolution of the workpiece W, that is, a feed amount per revolution [mm/rev], θ1 represents the taper angle [rad] of the workpiece W, θ2 represents the angle [rad] of the tool 11, K represents an oscillation amplitude magnification [magnification] and a represents a margin. For example, the oscillation amplitude magnification K for a part indicated by arrows in FIG. 4 is indicated by formula (2) below.

$$K = \frac{F\cos\theta 1 + F\sin\theta 1 \times \tan\theta 2}{F\cos\theta 1} + \alpha = 1 + \tan\theta 1 \times \tan\theta 2 + \alpha \quad (2)$$

Figure 5:
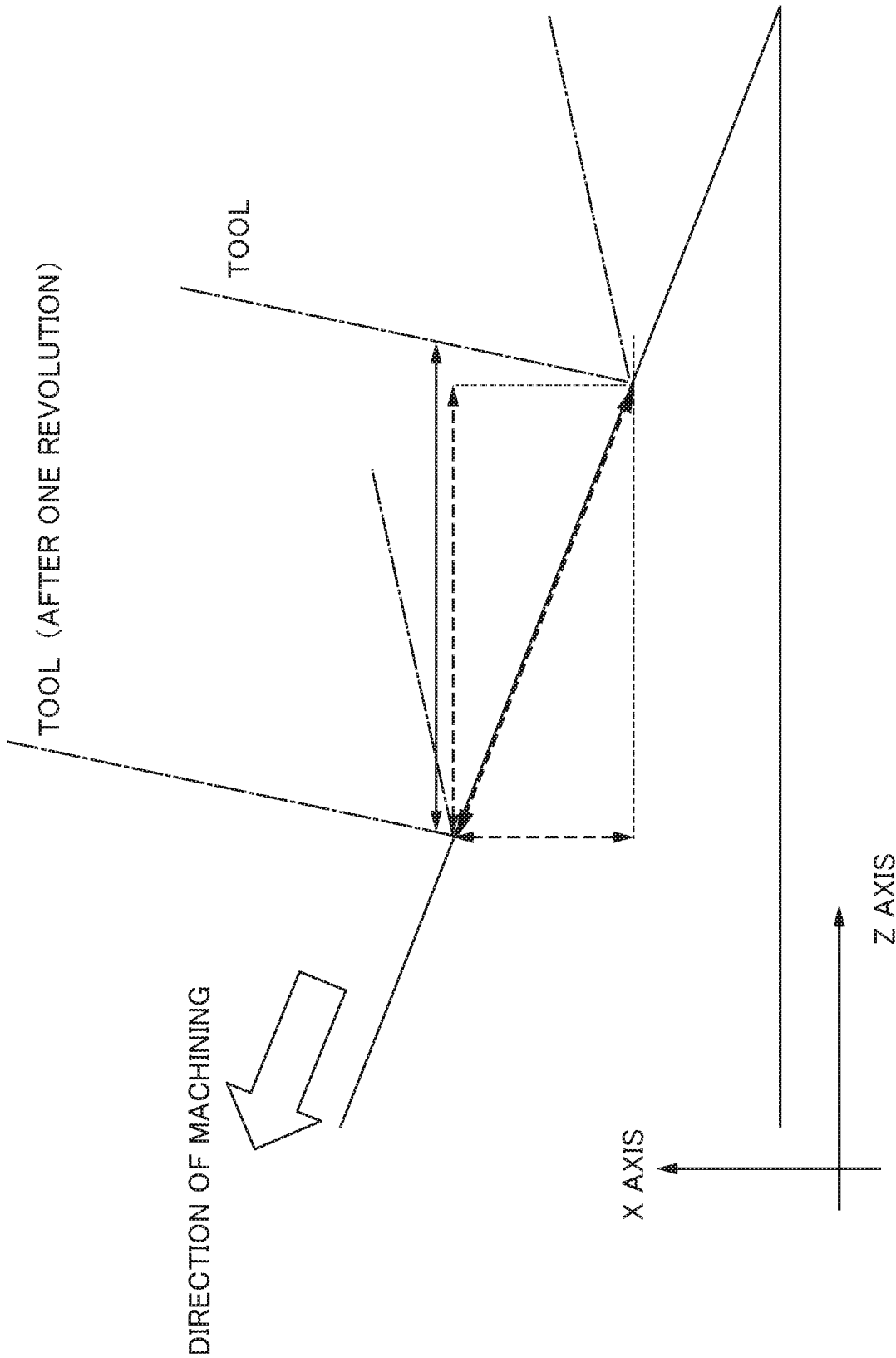
FIG. 5 is a diagram for comparing the widths of oscillation in feed axes (the Z axis and an X axis) in a case where oscillation is performed in only the direction of the Z axis which is not the direction of the machining in FIG. 4 and the widths of oscillation in the feed axes (the Z axis and the X axis) in a case where oscillation is performed in the direction of the machining.

In FIGS. 4 and 5, it is assumed that margin α=0.

In this way, as shown in FIG. 5, as compared with the width of oscillation in the direction of the Z axis (broken-line arrows) and the width of oscillation in the direction of the X axis (broken-line arrows) in a case where oscillation is performed in the direction of the machining, the width of oscillation in the direction of the Z axis (solid-line arrows) is slightly increased, and the width of oscillation in the direction of the X axis (solid-line arrows) is 0, with the result that the total width of oscillation in a plurality of feed axes is reduced. Hence, the magnitude of the load in the entire machine tool is reduced.

As shown in FIG. 4, in order for chips to be shredded by one axis oscillation, a necessary oscillation amplitude magnification K is changed depending on the taper angle θ1 of the workpiece and the angle θ2 of the tool. Although the maximum oscillation amplitude magnification may be set to be fixed, since the oscillation amplitude is increased as the taper angle of the workpiece is decreased, the magnitude of the load is increased, with the result that it costs more to provide the machine which can withstand it. When the workpiece machining shape is an arc, the oscillation amplitude magnification is preferably changed with the assumption that the taper angle θ1 of the workpiece is changed.

Figure 6:
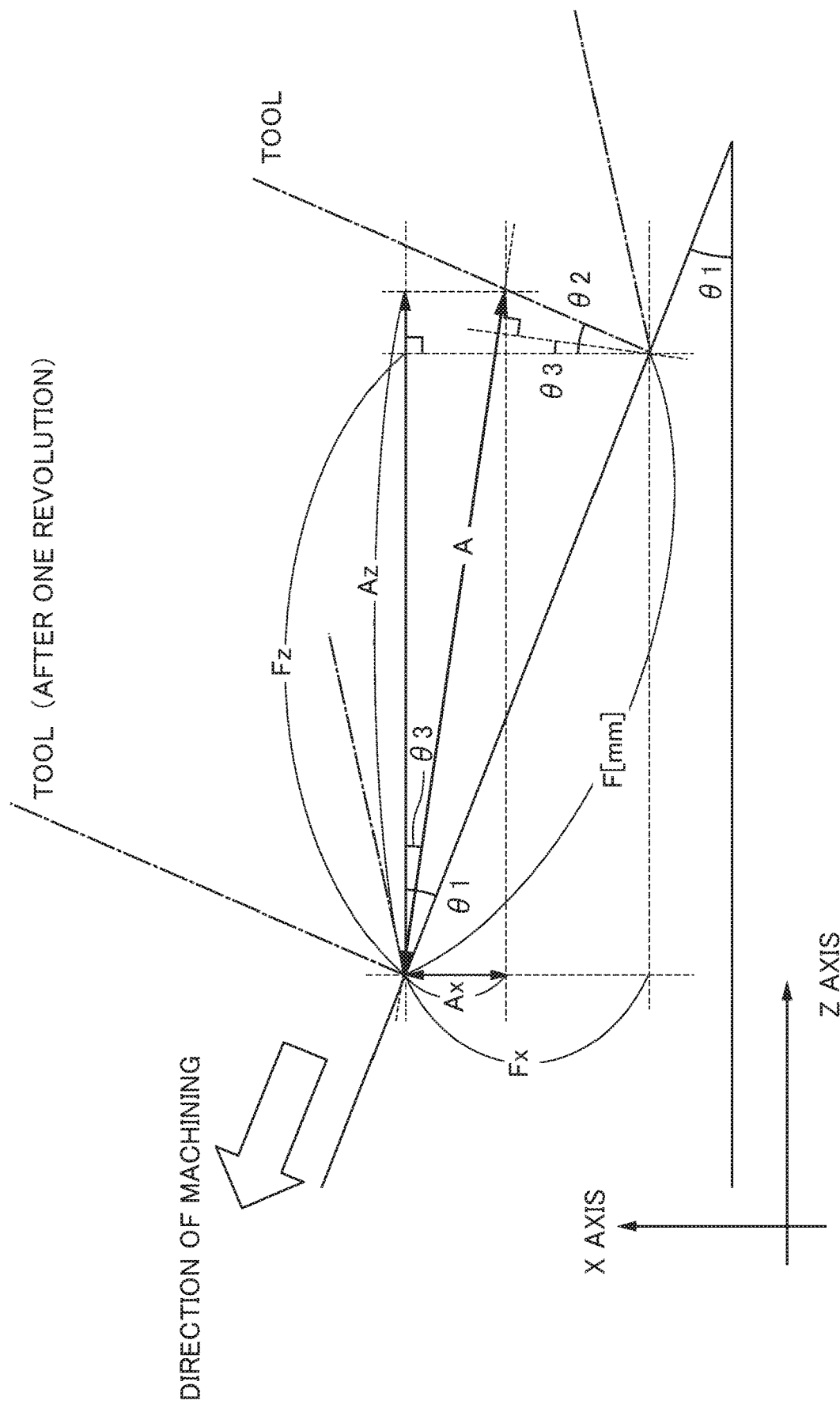
FIG. 6 is a diagram for illustrating a method of calculating, when the workpiece machining shape is conical or truncated conical (tapered) or when it includes an arc shape, oscillation amplitude magnifications for the feed axes (the Z axis and the X axis) in a case where oscillation is performed in a direction which is slightly inclined with respect to the direction of the Z axis and which is not the direction of the machining.

FIG. 6 is a diagram for illustrating a method of calculating, when the workpiece machining shape is conical or truncated conical (tapered) or when it includes an arc shape, oscillation amplitude magnifications K for the feed axes M1 and M2 (the Z axis and the X axis) in a case where oscillation is performed in a direction which is slightly inclined with respect to the direction of the Z axis and which is not the direction of the machining. In FIG. 6, Fz and Fx represent the amounts of movement of the tool 11 per revolution of the workpiece W in the Z axis and the X axis, that is, feed amounts per revolution [mm/rev], θ3 represents an inclination angle [rad] with respect to the direction of the Z axis, Kz and Kx represent oscillation amplitude magnifications [magnification] in the Z axis and the X axis and αz and αx represent margins in the Z axis and the X axis.

For example, the minimum width of oscillation A in the case of the feed amount per revolution F is indicated by formula (3) below.

$$A = F\cos(\theta_1 - \theta_3) + F\sin(\theta_1 - \theta_3) \times \tan(\theta_2 - \theta_3) \quad (3)$$

In this way, for example, the oscillation amplitude magnifications Kz and Kx in the Z axis and the X axis are indicated by formula (4) below and formula (5) below.

$$Kz = \frac{Az}{Fz} + \alpha z \quad (4)$$
$$= \frac{A\cos\theta_3}{F\cos\theta_1} + \alpha z$$
$$= \frac{\cos\theta_3 \times (\cos(\theta_1 - \theta_3) + \sin(\theta_1 - \theta_3) \times \tan(\theta_2 - \theta_3))}{\cos\theta_1} + \alpha z$$

$$Kx = \frac{Ax}{Fx} + \alpha x \quad (5)$$
$$= \frac{A\sin\theta_3}{F\sin\theta_1} + \alpha x$$
$$= \frac{\sin\theta_3 \times (\cos(\theta_1 - \theta_3) + \sin(\theta_1 - \theta_3) \times \tan(\theta_2 - \theta_3))}{\sin\theta_1} + \alpha x$$

When in formula (4), it is assumed that θ3=0, it is identical to formula (2) where oscillation is performed in only the direction of the Z axis. In FIGS. 6 and 7, it is assumed that the margin αz=0 and the margin αx=0.

In this way, as shown in FIG. 7, as compared with the width of oscillation in the direction of the Z axis (broken-line arrows) and the width of oscillation in the direction of the X axis (broken-line arrows) in a case where oscillation is performed in the direction of the machining, the width of oscillation Az in the direction of the Z axis (solid-line arrows) is slightly increased, and the width of oscillation Ax in the direction of the X axis (solid-line arrows) is reduced. When the oscillation in the direction of the X axis more affects the machine, the magnitude of the load in the entire machine tool is reduced.

The oscillation frequency calculation unit 232 calculates the oscillation frequency based on the machining conditions. Specifically, the oscillation frequency calculation unit 232 calculates the oscillation frequency S/60×I based on the rotation speed S [min$^{-1}$] or [rpm] of the workpiece W about the center axis line and the oscillation frequency magnification I.

The oscillation command calculation unit 233 calculates, based on the oscillation amplitude and the oscillation frequency, the oscillation command by formula (1).

Then, the control unit 26 includes the adder 24, the subtractor 25, the learning control unit 27 and the position speed control unit 28. The subtractor 25 determines the position error which is a difference between the position command (movement command) created by the position command creation unit 22 and the position feedback (actual positions) from the encoders in the feed axes M1 and M2. The adder 24 adds the position error output from the subtractor 25 and the oscillation command created by the oscillation command creation unit 23 so as to create the combined command.

The learning control unit 27 inputs the combined command immediately after being output from the adder 24, performs learning control so as to decrease the amount of compensation of the combined command, thereby determines the amount of compensation of the combined command and adds it to the combined command immediately before being input to the position speed control unit 28.

The position speed control unit 28 performs, based on the combined command which is compensated for by the learning control unit 27, position control, speed control and current control so as to perform drive control on the servo motor in the feed axes M1 and M2.

As described above, in the controller 20 of the machine tool of the present embodiment, when the workpiece machining shape is conical or truncated conical (tapered) or when it includes an arc shape, the oscillation command is automatically changed such that oscillation is performed in a direction which is not the direction of the machining (combined direction of the direction of the Z axis and the direction of the X axis). In this way, it is possible to reduce the total width of oscillation in a plurality of feed axes, to reduce the magnitude of the load in the entire machine tool and to reduce an increase in the magnitude of the load in the machine tool caused by oscillation cutting. It is also possible to reduce the oscillation of the feed axis whose load is high and to reduce an increase in the magnitude of the load in the machine tool caused by oscillation cutting.

Incidentally, when backlash is present in the drive mechanism unit of the tool 11 or when the rigidity of the drive mechanism unit is low, a control gain is set high in order to enhance the response of the servo, and thus vibrations occur, with the result that the accuracy of the position of the tool 11 may be unstable. For example, even when the feed axes M1 and M2 are driven based on command values corresponding to the curves A1, A2, A3 and the like shown in FIG. 3, it is likely that the actual position of the tool 11 does not completely follow the curves A1, A2, A3 and the like. In this case, when in the overlapping parts B1, B2, B3, B4 and the like, the actual position of the tool 11 does not agree with command values such as the curves A1, A2 and A3, intermittent cutting does not occur, with the result that chips are prevented from being satisfactorily formed.

Hence, in the present embodiment, the learning control is used so as to enhance the degree to which the oscillation command is followed. The learning control is a control system that enhances the degree to which a "periodic command where a repeated pattern is fixed" is followed, and that can reduce the position error as the period proceeds from the first period to the second period, to the third period, . . . . Specifically, the position error which corresponds to a predetermined number of vibration periods in the workpiece W and the tool 11 is learned and is set to the amount of compensation, and thus a periodic increase in the position error caused by the oscillation command is reduced. Furthermore, for example, as the period of the learning, a period (for example, one oscillation period=1/oscillation frequency) which is determined from the oscillation frequency of the oscillation command in formula (1) described above can be used. The control unit 26 converts one oscillation period to a period in the rotation angle and determines, in each of phases determined by dividing the period in the rotation angle by a predetermined division number, the amount of compensation of the combined command. In the control unit 26, the amount of compensation of the combined command is determined in each of the phases, one period of learning is stored, the amount of compensation in the phase in the preceding period of learning is added to the current combined command and thus a phase error included in the combined command is reduced to around zero. Consequently, the actual position of the tool 11 gradually approaches the curves A1, A2, A3 and the like of the command values so as to finally agree with the curves A1, A2, A3 and the like of the command values. In this case, the curves A1, A2, A3 and the like of the command values include the overlapping parts B1, B2, B3, B4 and the like, and thus intermittent cutting certainly occurs, with the result that it is possible to reliably form shredded chips.

(Variation 1)

In the embodiment described above, the oscillation amplitude calculation unit 231 calculates the oscillation amplitude magnification based on the machining conditions and the machine conditions. However, the present invention is not limited to this configuration, and the controller 20 may previously store, in the storage unit, a table or a function (information) in which a plurality of oscillation amplitude magnifications and a plurality of taper angles of the workpiece are associated, and the oscillation amplitude calculation unit 231 may acquire the oscillation amplitude magnification corresponding to the taper angle of the workpiece in the table or the function.

(Variation 2)

In the embodiment described above, when the workpiece machining shape is conical or truncated conical (tapered) or when it includes an arc shape, the oscillation command creation unit 23 automatically changes the oscillation command such that oscillation is performed in a direction which is not the direction of the machining (combined direction of the direction of the Z axis and the direction of the X axis), that is, so as to change a direction of the oscillation. However, there is no limitation to the oscillation command creation unit 23, and when the workpiece machining shape is conical or truncated conical (tapered) or when it includes an arc shape, that is, when the machining conditions indicate the machining by the simultaneous interpolation operation of the feed axes M1 and M2, the oscillation command creation unit 23 may change the oscillation command so as to stop the oscillation.

Although the embodiment of the present invention is described above, the present invention is not limited to the embodiment described above, and various modifications and variations are possible. For example, although in the embodiment described above, the configuration is illustrated in which as the workpiece W is rotated, the tool 11 oscillates along the generatrix of the outer circumferential surface of the workpiece W, the present invention is not limited to this configuration. The machine tool according to the present invention preferably has a configuration in which the machine tool controls the spindle M0 for relatively rotating the workpiece W and the tool 11 about the center axis line of the workpiece W, at least two feed axes M1 and M2 for relatively feeding the workpiece W and the tool 11 in the direction of the machining along the center axis line and the like so as to machine the workpiece W. For example, a configuration in which the tool 11 is rotated about the center axis line of the workpiece W and in which the workpiece W oscillates with respect to the tool 11 and a configuration in which the workpiece W is rotated and in which the workpiece W oscillates with respect to the tool 11 in a direction along the generatrix of the outer circumferential surface of the workpiece W can be assumed. In the present invention, a machining method of cutting the workpiece W by the rotation of the tool 11 about the center axis line of the workpiece W is also one type of machining.

EXPLANATION OF REFERENCE NUMERALS 1 machining system
10 machine tool
11 tool
20 controller
22 position command creation unit
23 oscillation command creation unit
231 oscillation amplitude calculation unit
232 oscillation frequency calculation unit
233 oscillation command calculation unit
24 adder
25 subtractor
26 control unit
27 learning control unit
28 position speed control unit
29 storage unit
M0 spindle
M1, M2 feed axis
W workpiece

What is claimed is:

1. A controller of a machine tool which includes: a spindle that relatively rotates a workpiece and a tool; and a plurality of feed axes that relatively feed the workpiece and the tool, and which machines the workpiece while making the tool and the workpiece oscillate relatively by a coordinated operation of the spindle and the feed axes so as to shred a chip generated by the machining, the controller comprising:

an oscillation command creation unit which creates an oscillation command based on a machining condition; and a control unit which machines, based on the oscillation command and a movement command, the workpiece while making the tool and the workpiece oscillate relatively, wherein the oscillation command creation unit creates, when the machining condition indicates machining by an interpolation operation of one feed axis of the plurality of feed axes, the oscillation command so as to make the tool and the workpiece oscillate relatively in a direction along a machining path and changes, when the machining condition indicates machining by a simultaneous interpolation operation of the plurality of feed axes, the oscillation command so as to change a direction of the oscillation with respect to the machining path from a first direction to a second direction by reducing an oscillation amplitude of one of the plurality of feed axes in the second direction relative to an oscillation amplitude of the one of the plurality of feed axes in the first direction.

2. The controller of the machine tool according to claim 1, wherein the oscillation command creation unit includes:

an oscillation amplitude calculation unit which calculates an oscillation amplitude based on an oscillation amplitude magnification and the movement command; and an oscillation command calculation unit which calculates the oscillation command based on the oscillation amplitude.

3. The controller of the machine tool according to claim 2, wherein the oscillation amplitude calculation unit calculates the oscillation amplitude magnification based on the machining condition and a machine condition.

4. The controller of the machine tool according to claim 3, wherein the machining condition includes information indicating machining by an interpolation operation of the plurality of feed axes for a taper or an arc of the workpiece and a taper angle of the workpiece, and
the machine condition includes an angle of the tool.

5. The controller of the machine tool according to claim 2, the controller further comprising: a storage unit that previously stores information in which a plurality of the oscillation amplitude magnifications and a plurality of taper angles of the workpiece are associated with each other,
wherein the oscillation amplitude calculation unit acquires the oscillation amplitude magnification corresponding to the taper angle of the workpiece in the information.

6. The controller of the machine tool according to claim 1, wherein when the machining condition indicates the machining by the simultaneous interpolation operation of the plurality of feed axes, the oscillation command calculation unit changes the oscillation command so as to make the tool and the workpiece oscillate relatively in a direction of the feeding of one feed axis of the plurality of feed axes.

7. A controller of a machine tool which includes: a spindle that relatively rotates a workpiece and a tool; and a plurality of feed axes that relatively feed the workpiece and the tool, and which machines the workpiece while making the tool and the workpiece oscillate relatively by a coordinated operation of the spindle and the feed axes so as to shred a chip generated by the machining, the controller comprising:
an oscillation command creation unit which creates an oscillation command based on a machining condition; and
a control unit which machines, based on the oscillation command and a movement command, the workpiece while making the tool and the workpiece oscillate relatively,
wherein the oscillation command creation unit
creates, when the machining condition indicates machining by an interpolation operation of one feed axis of the plurality of feed axes, the oscillation command so as to make the tool and the workpiece oscillate relatively in a direction along a machining path and
changes, in response to the machining condition indicating machining by a simultaneous interpolation operation of the plurality of feed axes, the oscillation command so as to stop the oscillation.

8. The controller of claim 1, wherein changing the direction reduces a load on the machine tool.

* * * * *